United States Patent Office 3,277,208
Patented Oct. 4, 1966

3,277,208
CURABLE COMPOSITION CONTAINING CHLORO-SULFONATED POLYETHYLENE AND CHLORINATED POLYEPOXIDE
Arthur Nersasian, New Castle, Del., assignor to E. I. du Pont de Nemours and Company, Wilmington, Del., a corporation of Delaware
No Drawing. Filed Mar. 26, 1963, Ser. No. 267,940
8 Claims. (Cl. 260—837)

This invention relates to curable elastomeric compositions of chlorosulfonated polyethylenes and epoxide compounds derived from chlorinated bis-phenols. More particularly this invention relates to said curable compositions, the process for curing these compositions and their cured products.

Chlorosulfonated polyethylenes may be cured by means of certain metal oxides and related compounds. Certain epoxy compounds, preferably diepoxy compounds such as 2,2-bis[4-(2,3-epoxy-propoxy) phenyl]propane, are advantageously added in small amounts (1–3%) as part of the curing system, partly to combine with small amounts of hydrogen chloride formed during the curing operation. Small amounts of these epoxy compounds are also used to stabilize the chlorosulfonated polyethylene during storage. Alternatively, chlorosulfonated polyethylene may be cured without metal oxides by means of larger amounts (for example, 10 to 20%) of the diepoxy compounds. Although both these curing systems are very useful, improvement in either the physical properties of the cured products or reduction of the tendency to scorch would be advantageous. Since, however, changes in curing systems which reduce scorching in general have a corresponding adverse effect on the physical properties of the cured material, it is not to be expected that both improvement in properties and reduction in scorchings would be obtained at the same time.

It is an object of this invention to provide novel curable elastomeric chlorosulfonated polyethylene compositions. Another object is to provide a process for curing these compositions. A further object is to provide novel cured elastomeric chlorosulfonated polyethylene polymers. A still further object it to provide said curable elastomeric compositions which have reduced scorching tendencies upon being cured and also have improved physical characteristics as cured elastomers. Other objects will appear hereinafter.

These and other objects are accomplished by a curable composition of chlorosulfonated polyethylene and from about 0.002 to 0.12 gram equivalents, based on the epoxy groups per 100 grams of chlorosulfonated polyethylene, of at least one diepoxy curing agent of the formula

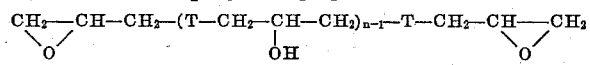

where T is

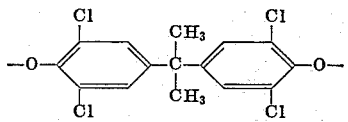

and n is a positive integer no greater than 4. The cured elastomers of this invention are prepared by heating these curable compositions at a temperature of about 60° C. to 300° C. and recovering the cured polymer. By utilizing the diepoxy compounds of the above formula, a significant reduction is noticed in the scorching effect during the cure of the chlorosulfonated polyethylenes. Equally as beneficial as the reduction of the scorch tendency of the polymer is the unexpected increase of desirable tensile properties of the cured polymer. Illustrative showings of these effects are found in the examples.

The preferred curing agent is the first member of the series represented by the above general formula, that is, the one containing only one diphenol residue, with $n=1$, which may be called the diglycidyl ether of 4,4'-isopropylidene bis(2,6-dichlorophenol) or 2,2-bis[3,5-dichloro-4-(2,3-epoxypropoxy)phenyl]propane, represented by the formula

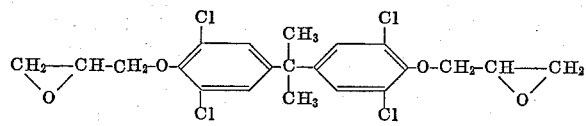

The higher members of the series, as is evident from the general formula, contain two or more of the bisphenol residues but only two epoxy groups. Accordingly, more of these higher members by weight is required to give epoxy groups in equivalent amounts.

The amounts to be used of these epoxy curing agents are from 0.002 to 0.12 gram equivalents based on the epoxy groups, for each 100 grams of the chlorosulfonated polyethylene to be cured, with the limitation that no more than 50 grams of curing agent be used per 100 grams of chlorosulfonated polyepoxide. If more than this amount is used, the rubbery properties of the resulting compositions are materially lessened by the dilution with the curing agents. For the purpose of the present invention, it is not essential that the pure compounds represented by the above formula be used. In fact, their mixtures, which are more economical to prepare, may be used to advantage.

The epoxy content of the subject curing agents and their mixtures is conveniently expressed by the analytically determined epoxide equivalent, the number of epoxy groups expressed in gram equivalents, contained in 100 grams of material. Thus for the first member of the series of diepoxy compounds represented above ($n=1$), with molecular weight 478, the epoxide equivalent is 0.42. The number of grams of curing agent to be used per 100 grams of the elastomer in any given case is therefore calculated by multiplying by 100 the gram equivalents selected for the cure and dividing by the epoxide equivalent.

The diepoxy curing agents of the present invention are made by reacting the bisphenol 4,4'-isopropylidene bis(2,6-dichlorophenol) with epichlorohydrin. When the mole ratio of the latter to the bisphenol is much greater than 2, for example 10, the first member of the series ($n=1$ in the above general formula) is formed almost exclusively. As this ratio is reduced, the higher members of the series are formed in increasing amounts but the reaction product is a mixture. This still contains large proportions of the first member, as long as the ratio is well above 2. When more of the higher members are desired, this ratio is decreased but should not usually be much below 2. These relationships are well known in the prior art in connection with making diepoxy compounds from epichlorohydrin and simple diphenols. These mixtures are more economically prepared than the pure first member of the series and since they may be made so as to contain large proportions of this preferred compound, these mixtures may be used to great advantage. When the higher individual members of the series are desired they may be separated and purified by crystallization.

Like the diepoxy compounds of the prior art referred to above, the subject compounds may be used for curing the chlorosulfonated polyethylene either (1) with an oxide or hydroxide of a polyvalent metal (preferably divalent) or with a salt of such a metal prepared with an acid of ionization constant less than $1 \times 10^{-3}$, as described in U.S. Patents 2,416,060 and 2,416,061, or (2) in the absence of the metallic compounds. The larger amounts of the subject epoxy compounds and preferably 0.04 to 0.10 gram equivalents per 100 grams of elastomer which is equal to about 10 to 25% of the first member of the series are usually used in the absence of the metallic curing agents. Smaller amounts, preferably 0.004 to 0.02 gram equivalents which equals about 1–5% of the first member, are used with the metallic compounds.

According to the patents referred to above, the metallic curing agents are used in amounts between 2 (preferably 10) and 60% by weight of the polymer, along with carboxylic acids of high molecular weight, such as rosin and stearic acid, and the curing temperature is 60–300° C. Preferred metals are magnesium (as the oxide or hydroxide) and lead (as litharge and its basic salts such as the basic maleate and phthalate). The preferred curing temperatures are 120–180° C. In both the presence and absence of the metallic compounds, it is advantageous to have present also one or more of the compounds commonly used as accelerators for the vulcanization of rubber, particularly mercaptothiazolines and thiazols, thiuram and thiazyl polysulfides, and diaryl guanidines. They are usually used in amounts between 0.5 and 3.0%. Mixtures of two or more accelerators are often advantageous.

The present invention may be applied to any elastomeric chlorosulfonated polyethylene, including those made from branched, low density, and linear high density types of polyethylene with melt-index between 0.2 and 200. The chlorine content is usually between 20 and 48% and the sulfur content between 0.1 and 3.0%, and preferably between 0.8 and 1.5%.

The following examples will better illustrate the nature of the present ivnention; however, the invention is not intended to be limited to these examples. Parts are by weight unless otherwise indicated.

PREPARATION OF THE DIGLYCIDYL ETHER OF 4,4' - ISOPROPYLIDENE BIS(2,6 - DICHLOROPHENOL)

The first member of the series represented above, is made as follows: 82.4 grams or 0.225 mole of 4,4'-isopropylidene bis(2,6-dichlorophenol), 208.1 grams or 2.25 moles of epichlorohydrin, and 1 milliliter of water are stirred together and heated to 90° C. Powdered sodium hydroxide is then added at such a rate as to maintain a temperature between 90 and 100° due to the exothermic reaction. When 18.8 grams (0.47 mole) has been added, the reaction mass is heated at the same temperature for 30 minutes or more. The reaction mass is then cooled and diluted with 230 milliliters of benzene. The sodium chloride is filtered out and the benzene and excess epichlorohydrin are removed by distillation at low pressure. If more sodium chloride precipitates at this point, the mass is again diluted with benzene, filtered, and distilled. There remains after complete removal of benzene, a clear, viscous oil which crystallizes on standing. The melting point is about 40° C. Its determined chlorine content (29.7%) is the same as calculated for $C_{21}H_{20}O_4Cl_4$. The epoxide equivalent (0.40) is slightly less than calculated (0.42), but within the limits of precision of the analytical method used. A small proportion of the next higher member of the series ($n=2$) may however be present.

As the proportion of epichlorohydrin in the above preparation is decreased, the proportion of the higher members of the series, given by the above general formula, increases. The resulting mixtures are viscous liquids of decreasing epoxide equivalents. Their preparation is otherwise the same.

Example 1

A chlorosulfonated linear polyethylene, containing 35% chlorine and 1.0% sulfur, is compounded as follows:

| | Parts by weight |
|---|---|
| Chlorosulfonated polyethylene | 100 |
| Titanium dioxide | 63.0 |
| Benzothiazyl disulfide | 0.5 |
| Dipentamethylene thiuram tetrasulfide | 2.0 |
| Diorthotolyl guanidine | 0.25 |
| Diglycidyl ether of 4,4'-isopropylidene bis(2,6-dichlorophenol) (epoxide equivalent 0.40) made as above | 18.8 |

This is compared with a control composition identical with the above except that it contains, instead of the last-mentioned diglycidyl ether, an equivalent amount, 15 parts or 0.075 equivalents of a mixture (epoxide equivalent 0.50), of the corresponding chlorine-free diepoxy compound, 2,2'-bis[4-(2,3-epoxypropoxy)phenyl]propane and small proportions of the higher condensation products. The cure is for 30 minutes at 153° C. The following test results are obtained on the resulting cured slabs or other cured test pieces. The scorch times are determined with the Mooney shearing disc viscometer (ASTM D–1646–59T). It will be seen that the subject compound, compared with an equivalent amount of the corresponding chlorine-free agent of the prior art, gives very substantially better tensile strength, modulus, and elongation, practically the same resilience, hardness, and set, and, unexpectedly, much better resistance to scorching.

TABLE I

| | With Chloro-epoxy Compound | With Chlorine-free Control |
|---|---|---|
| Tensile Strength at break | 2,170 | 1,530 lbs./sq. in. |
| Elongation at break | 590 | 560%. |
| Modulus (100%) | 165 | 150 lbs./sq. in. |
| Modulus (300%) | 365 | 270 lbs./sq.in. |
| Modulus (500%) | 935 | 655 lbs./sq. in. |
| Permanent set (D 412-51T) [1] | 28 | 28%. |
| Compression set (D 395-55) [1] | 49 | 47%. |
| Hardness (D 1415-567) [1] | 53 | 54%. |
| Resilience (D 945-59) | 62 | 62%. |
| Scorch time (D 1646-59T): [1] | | |
| For 10 point rise | 45 | 32 min. |
| For 20 point rise | >45 | 40 min. |

[1] ASTM designation.

Example 2

A chlorosulfonated linear polyethylene containing 35% chlorine and 1.0% sulfur is compounded as follows:

| | Parts by weight |
|---|---|
| Chlorosulfonated polyethylene | 100.0 |
| Semi-reinforcing carbon black | 25.0 |
| Litharge | 25.0 |
| Dipentamethylene thiuram tetrasulfide | 2.0 |
| Epoxy compound as shown Table II. | |

Each composition is cured at 153° C. for 7.5, 15, and 30 minutes and tested as in Example 1. The chlorodiepoxy compound, the diglycidyl ether of 4,4'-isopropylidene bis (2,6-dichlorophenol), made as above, is compared with the corresponding chlorine-free diepoxy compound, 2,2'-bis[4-(2,3-epoxypropoxy)phenyl]propane of the prior art, in the form of its mixture with small proportions of higher condensation products, such as is used in Example 1. The following test results are obtained with two concentrations (0.0075 and 0.015 gram equivalents) of each epoxy compound for the three curing times at 153° C. As in Example 1, the chlorine-free epoxy curing agent in the control composition is used in amounts equivalent to the amount of chlorodiepoxy compound. The results again indicate that the chlorodiepoxy compound, in comparison with the corresponding chlorine-free compound, gives better tensile strength, modulus, and elongation and much better resistance to scorching, along with essentially unchanged set, resilience, and hardness. The effects are sizable even though only approximately one-tenth as much agent is used here, with litharge, as in Example 1, with no active metal oxide.

TABLE II

| Chloroepoxy compound | 1.9 | | | 3.8 | | | 1.5 | | | 3.0 | | |
|---|---|---|---|---|---|---|---|---|---|---|---|---|
| Chlorine-free control | | | | | | | | | | | | |
| Cure time, at 153° C | 7.5 | 15 | 30 | 7.5 | 15 | 30 | 7.5 | 15 | 30 | 7.5 | 15 | 30 |
| Tensile strength | 3,000 | 4,100 | 3,870 | 3,650 | 4,100 | 3,360 | 3,470 | 3,850 | 3,080 | 2,300 | 3,670 | 3,800 |
| Elongation | 460 | 330 | 290 | 480 | 370 | 280 | 440 | 360 | 320 | 460 | 460 | 380 |
| Modulus (100%) | 375 | 560 | 630 | 375 | 485 | 530 | 380 | 510 | 510 | 310 | 400 | 525 |
| Modulus (300%) | 2,340 | 3,670 | | 2,130 | 3,130 | | 2,080 | 3,050 | 2,820 | 1,220 | 2,070 | 2,730 |
| Permanent set | 14 | 6 | 4 | 25 | 10 | 5 | 22 | 10 | 9 | 32 | 24 | 12 |
| Compression set | 58 | 37 | 19 | 65 | 34 | 24 | 52 | 43 | 27 | 78 | 59 | 35 |
| Hardness | 62–3 | 62–3 | 62–3 | 62–3 | 62–3 | 62–3 | 62–3 | 62–3 | 62–3 | 62–3 | 62–3 | 62–3 |
| Resilience | 64 | 65 | 66 | 62 | 64 | 64 | 64 | 65 | 66 | 62 | 63 | 65 |
| Scorch time: | | | | | | | | | | | | |
| For 10 point rise | | 35 | | | 42 | | | 22 | | | 27 | |
| For 20 point rise | | >45 | | | >45 | | | 27 | | | 32 | |

See Table I of Example for units and source of tests.

As many widely different embodiments of this invention may be made without departing from the spirit and scope thereof, it is to be understood that this invention is not limited to the specific embodiments thereof except as defined in the appended claims.

What is claimed is:

1. A curable elastomeric composition containing chlorosulfonated polyethylene which contains about 20 to 48 percent by weight of chlorine and about 0.1 to 3.0 percent by weight sulfur and from about 0.002 to 0.12 gram equivalents, based on the epoxy groups per 100 grams of said chlorosulfonated polyethylene, of at least one diepoxy compound of the formula $$CH_2-CH-CH_2-(T-CH_2-CH-CH_2)_{n-1}-T-CH_2-CH-CH_2$$
$$\phantom{CH_2-}\underset{O}{\diagdown\diagup}\phantom{CH_2}\phantom{(T-CH_2-}\underset{OH}{|}\phantom{CH_2)_{n-1}}\phantom{T-CH_2-}\underset{O}{\diagdown\diagup}$$

where T is $$-O-\underset{Cl}{\overset{Cl}{\bigcirc}}-\underset{CH_3}{\overset{CH_3}{\underset{|}{C}}}-\underset{Cl}{\overset{Cl}{\bigcirc}}-O-$$

and $n$ is no greater than 4, with the proviso that said diepoxy compound can be present in no greater amount than 50 grams per 100 grams of said chlorosulfonated polyethylene.

2. A curable elastomeric composition containing chlorosulfonated polyethylene which contains about 20 to 48 percent by weight of chlorine and about 0.1 to 3.0 percent by weight sulfur and from about 0.04 to 0.10 gram equivalents, based on the epoxy groups per 100 grams of said cholrosulfonated polyethylene, of at least one diepoxy compound of the formula $$CH_2-CH-CH_2-(T-CH_2-CH-CH_2)_{n-1}-T-CH_2-CH-CH_2$$

where T is $$-O-\underset{Cl}{\overset{Cl}{\bigcirc}}-\underset{CH_3}{\overset{CH_3}{\underset{|}{C}}}-\underset{Cl}{\overset{Cl}{\bigcirc}}-O-$$

and $n$ is no greater than 4, with the proviso that said diepoxy compound can be present in no greater amount than 50 grams per 100 grams of said chlorosulfonated polyethylene.

3. A curable elastomeric composition containing chlorosulfonated polyethylene which contains about 20 to 48 percent by weight of chlorine and about 0.1 to 3.0 percent by weight sulfur, about 2 to 60 percent by weight of a polyvalent metallic curing agent, and from about 0.004 to 0.02 gram equivalents, based on the epoxy groups per 100 grams of said chlorosulfonated polyethylene, of at least one diepoxy compound of the formula $$CH_2-CH-CH_2-(T-CH_2-CH-CH_2)_{n-1}-T-CH_2-CH-CH_2$$

where T is $$-O-\underset{Cl}{\overset{Cl}{\bigcirc}}-\underset{CH_3}{\overset{CH_3}{\underset{|}{C}}}-\underset{Cl}{\overset{Cl}{\bigcirc}}-O-$$

and $n$ is no greater than 4, with the proviso that said diepoxy compound can be present in no greater amount than 50 grams per 100 grams of said chlorosulfonated polyethylene.

4. A process for curing chlorosulfonated polyethylene poylmers which comprises (1) heating chlorosulfonated polyethylene which contains about 20 to 48 percent by weight of chlorine and about 0.1 to 3.0 percent by weight sulfur in the presence of about 2 to 60 percent by weight of said polymer of a polyvalent metallic curing agent and from about 0.002 to 0.12 gram equivalents, based on the epoxy groups per 100 grams and said polymer, of at least one diepoxy compound of the formula $$CH_2-CH-CH_2-(T-CH_2-CH-CH_2)_{n-1}-T-CH_2-CH-CH_2$$

where T is $$-O-\underset{Cl}{\overset{Cl}{\bigcirc}}-\underset{CH_3}{\overset{CH_3}{\underset{|}{C}}}-\underset{Cl}{\overset{Cl}{\bigcirc}}-O-$$

and $n$ is no greater than 4, with the proviso that said diepoxy compound can be present in no greater amount than 50 grams per 100 grams of said polymer and (2) recovering the cured chlorosulfonated polyethylene.

5. A cured elastomeric chlorosulfonated polyethylene polymer prepared by the process described in claim 4.

6. A process for curing chlorosulfonated polyethylene polymers which comprises (1) heating chlorosulfonated ethylene which contains about 20 to 48 percent by weight of chlorine and about 0.1 to 3.0 percent by weight sulfur in the presence of from about 10 to 60 percent by weight of said polymer of a divalent metallic curing agent and from about 0.004 to 0.02 gram equivalents, based on the epoxy groups per 100 grams of said polymer, of at least one diepoxy compound of the formula $$CH_2-CH-CH_2-(T-CH_2-CH-CH_2)_{n-1}-T-CH_2-CH-CH_2$$

where T is $$-O-\underset{Cl}{\overset{Cl}{\bigcirc}}-\underset{CH_3}{\overset{CH_3}{\underset{|}{C}}}-\underset{Cl}{\overset{Cl}{\bigcirc}}-O-$$

and $n$ is no greater than 4, with the proviso that said diepoxy compound can be present in no greater amount than 50 grams per 100 grams of said polymer and (2) recovering the cured chlorosulfonated polyethylene.

7. A process for curing chlorosulfonated polyethylene polymers which comprises (1) heating chlorosulfonated polyethylene which contains about 20 to 48 percent by weight of chlorine and about 0.1 to 3.0 percent by weight sulfur in the presence of about 0.04 to 0.10 gram equivalents, based on the epoxy groups per 100 grams of said polymer, of at least one diepoxy compound of the formula

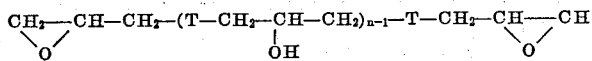

where T is

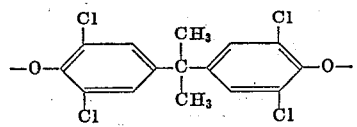

and $n$ is no greater than 4, with the proviso that said diepoxy compound can be present in no greater amount than 50 grams per 100 grams of said polymer and (2) recovering the cured chlorosulfonated polyethylene.

8. A cured elastomeric chlorosulfonated polyethylene polymer prepared by the process described in claim 7.

References Cited by the Examiner
UNITED STATES PATENTS 3,026,294    3/1962    Lieberman _____ 260—837
3,147,315    9/1964    Ennis et al. _____ 260—837

MURRAY TILLMAN, *Primary Examiner.*

P. LIEBERMAN, *Assistant Examiner.*